United States Patent
Ragot et al.

(10) Patent No.: US 12,337,671 B2
(45) Date of Patent: Jun. 24, 2025

(54) MOUNTING SYSTEM FOR ACCESSORY UNITS ON A VEHICLE

(71) Applicant: Volvo Truck Corporation, Gothenburg (SE)

(72) Inventors: Sebastien Ragot, Gothenburg (SE); Jonatan Hörder, Mölndal (SE); Mats Axelsson, Vallda (SE)

(73) Assignee: Volvo Truck Corporation, Gothenburg (SE)

( * ) Notice: Subject to any disclaimer, the term of this patent is extended or adjusted under 35 U.S.C. 154(b) by 282 days.

(21) Appl. No.: 17/921,500

(22) PCT Filed: May 5, 2020

(86) PCT No.: PCT/EP2020/062409
§ 371 (c)(1),
(2) Date: Oct. 26, 2022

(87) PCT Pub. No.: WO2021/223846
PCT Pub. Date: Nov. 11, 2021

(65) Prior Publication Data
US 2023/0158880 A1 May 25, 2023

(51) Int. Cl.
*B60K 1/04* (2019.01)
*B60L 50/60* (2019.01)

(52) U.S. Cl.
CPC ............... *B60K 1/04* (2013.01); *B60L 50/60* (2019.02); *B60K 2001/0438* (2013.01)

(58) Field of Classification Search
CPC .... B60K 1/04; B60K 2001/0438; B60L 50/60
See application file for complete search history.

(56) References Cited

U.S. PATENT DOCUMENTS

| 5,342,106 A * | 8/1994 | Fischer ............ B62D 33/0604 296/35.1 |
| 11,548,363 B2 * | 1/2023 | Kumagai ............... B62D 21/09 |
| 2013/0001384 A1 | 1/2013 | Karlsson et al. |

FOREIGN PATENT DOCUMENTS

| CN | 205468530 U | 8/2016 |
| CN | 106654089 A | 5/2017 |

(Continued)

OTHER PUBLICATIONS

International Search Report and Written Opinion for International Patent Application No. PCT/EP2020/062409, mailed Feb. 8, 2021, 12 pages.

(Continued)

*Primary Examiner* — Jason D Shanske
*Assistant Examiner* — James J Triggs
(74) *Attorney, Agent, or Firm* — Withrow & Terranova, PLLC

(57) ABSTRACT

The invention relates to a system for mounting an accessory unit to a vehicle. The mounting system comprise at least one side channel attached to the accessory unit, at least one screw-strip comprising a plate with a plurality of screws fitted at pre-defined locations defined by matching mounting positions of at least one bushing. The screw-strip is displaceable fitted in the side channel. The system further comprises at least one bracket arranged to receive the screws fitted on the screw-strip and to receive a nut for each screw arranged to fixate the mounting system by pressing the screws towards a locking arrangement in the side channel and wherein the bracket is arranged to receive a frame-mounted bushing mounted to a side rail of the vehicle frame.

14 Claims, 7 Drawing Sheets

(56) References Cited

FOREIGN PATENT DOCUMENTS

| | | |
|---|---|---|
| CN | 108146213 A | 6/2018 |
| CN | 109017254 A | 12/2018 |
| DE | 102016002097 A1 | 9/2016 |
| DE | 102016115404 A1 | 2/2018 |
| DE | 102017009176 A1 | 4/2018 |
| DE | 102018112141 A1 | 11/2018 |
| EP | 3034355 A1 | 6/2016 |
| WO | 2016096898 A1 | 6/2016 |
| WO | 2020041630 A1 | 2/2020 |

OTHER PUBLICATIONS

First Office Action for Chinese Patent Application No. 202080100446.5, mailed Dec. 19, 2024, 15 pages.

* cited by examiner

MOUNTING SYSTEM FOR ACCESSORY UNITS ON A VEHICLE

This application is a 35 USC 371 national phase filing of International Application No. PCT/EP2020/062409, filed May 5, 2020, the disclosure of which is incorporated herein by reference in its entirety.

TECHNICAL FIELD

The invention relates to a mounting device for accessory units on a vehicle and in particular, a flexible and scalable step-less interface.

The invention can be applied in heavy-duty vehicles, such as trucks, buses and construction equipment. Although the invention will be described with respect to a goods lorry, the invention is not restricted to this particular vehicle, but may also be used in other vehicles such as heavy duty construction equipment.

BACKGROUND

Recent development in the automotive area has been focusing on electrical drive solutions; this is true also for heavy-duty vehicles such as trucks, buses and construction equipment. This drives the need for new solutions around driveline, energy storage, construction and assembly of these types of vehicles. Generally, heavy-duty vehicles are often specially designed on a case-by-case basis or have a number of different accessory units installed on the vehicles depending on functionality and type of vehicle. For instance, energy storage systems, like for instance batteries, are generally heavy and take up large volumes in automotive applications. This is especially true for heavy-duty vehicles operating for long hours each day and with heavy loads. Furthermore, these types of vehicles, since they concern smaller manufacturing series, often specially designed solutions and heavy installations, need to be easily assembled during manufacturing but also easily serviced and repaired.

Another aspect of mounting of energy storage systems, such as batteries, or other accessories are safety concerns. There is a concern that different parts mounted in or on the vehicle are securely mounted and behave in a predictable manner if the vehicle is subjected to an accident. Thus, there is a need for secure handling of energy storage systems and the like.

Thus, there is a need for effective and reliable solutions for mounting of different parts of the vehicle during manufacturing and for servicing the vehicle. The mounting solutions often used today provide cumbersome processes and are quite complex in mounting procedures and mounting arrangements.

In DE10217009176, a coupling device for securing a vehicle component to a frame side member of a vehicle frame is discussed; however, in this solution complex alignment of the coupling device is needed.

SUMMARY

It is an object of the present invention to obviate at least some of the above disadvantages and provide improved system for mounting of energy storage systems or other accessory units to a vehicle frame. Thus, an object of the invention is to provide a system and a method for mounting an energy storage system or accessory unit to a frame of a heavy-duty vehicle. According to a first aspect of the present invention, this object is achieved by a system according to claim 1, in which a mounting system for mounting at least one accessory unit, such as an energy storage system, ESS, to a vehicle frame is provided. The mounting system comprise at least one side channel attached to the accessory unit, at least one screw-strip comprising a plate with a plurality of screws fitted at pre-defined locations or intervals defined by matching mounting positions of at least one frame-mounted bushing. The screw-strip is displaceable fitted in the side channel. The system further comprises at least one mounting bracket arranged to receive the screws fitted on the screw-strip and to receive a nut for each screw arranged to fixate the mounting system by pressing the screws towards a locking arrangement in the side channel and wherein the bracket is arranged to receive the frame-mounted bushing mounted to a side rail of the vehicle frame. The screw-strip provides a low cost solution for adjusting the position of the accessory unit in relation to the frame and the frame-mounted brackets.

The screw strip may provide a frictional breaking function of the mounting system if the vehicle is subjected to a rapid retardation. The frictional breaking function may be determined by the number of screws attached to the screw strip or by a mounting force asserted on each nut/screw joint of the screws mounted to the at least one frame mounted bracket. The braking function provide a more secure and pre-controlled behaviour of the accessory unit in case of a rapid retardation of the vehicle, e.g. in case of an accident.

The mounting system may further comprise at least two side channels and at least two screw-strips. The use of two or more channels on each side provide a better alignment, more secure mechanical suspension of the accessory unit, and more controlled behaviour of the accessory unit in case of a rapid retardation. Having two or more side channels provide a mechanically robust solution for mounting large and heavy accessory units to the vehicle.

The side channel may comprise a plurality of separate sections attached longitudinally to each other and together forming a continuous length along the at least one accessory unit. The side channel may be provided as an integral part of the accessory unit or attached to a side of the accessory unit. With the system according the present invention, several sections may be attached and easily handled. The different sections may also be different accessory types and still be mounted as a single unit. This is advantageous since it provides a highly flexible mounting solution where different types of accessory units may be mounted to a vehicle using the same mounting system.

Each channel may comprise a generally U shaped profile with inwardly protruding flanges acting as locking members for the screw-strip. The at least one side channel may be formed in an extruded metal profile, for example an extruded aluminium profile. This provides the advantage of a low cost means for providing a locking function.

In one example, the accessory unit may be an energy storage system, ESS. The mounting system for an ESS has the advantage of easy mounting during initial installation but also reduces the complexity of dismounting and remounting in case quickly changing energy storage system or for service of the ESS and/or the vehicle.

The mounting system may further comprise a frame-mounted bushing arranged to be mounted on a side rail of the vehicle and where the bushing comprise a protruding element arranged to receive the mounting bracket. This has the benefit of easily attaching the mounting bracket to the vehicle.

In another aspect of the present invention, a vehicle comprising a mounting system according to the present invention is provided.

Yet another aspect of the present invention is provided, a method for mounting an accessory unit to a vehicle, comprising the steps of pre-mounting at least one mounting bracket on at least one screw-strip comprising a plurality of screws fitted at pre-defined intervals defined by matching mounting positions of at least one frame-mounted bushing fixed on a side rail mounted to a frame of the vehicle, sliding each at least one screw-strip into a corresponding side channels attached to the accessory unit, securing the screw-strip to the at least one side channel fixating the movement of the screw-strip relative the side channel, and lifting the accessory unit into a position where the mounting-bracket (30) rests on the at least one frame-mounted bushing. This has the advantage of providing a quick and flexible mounting solution for accessory units on to vehicles.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
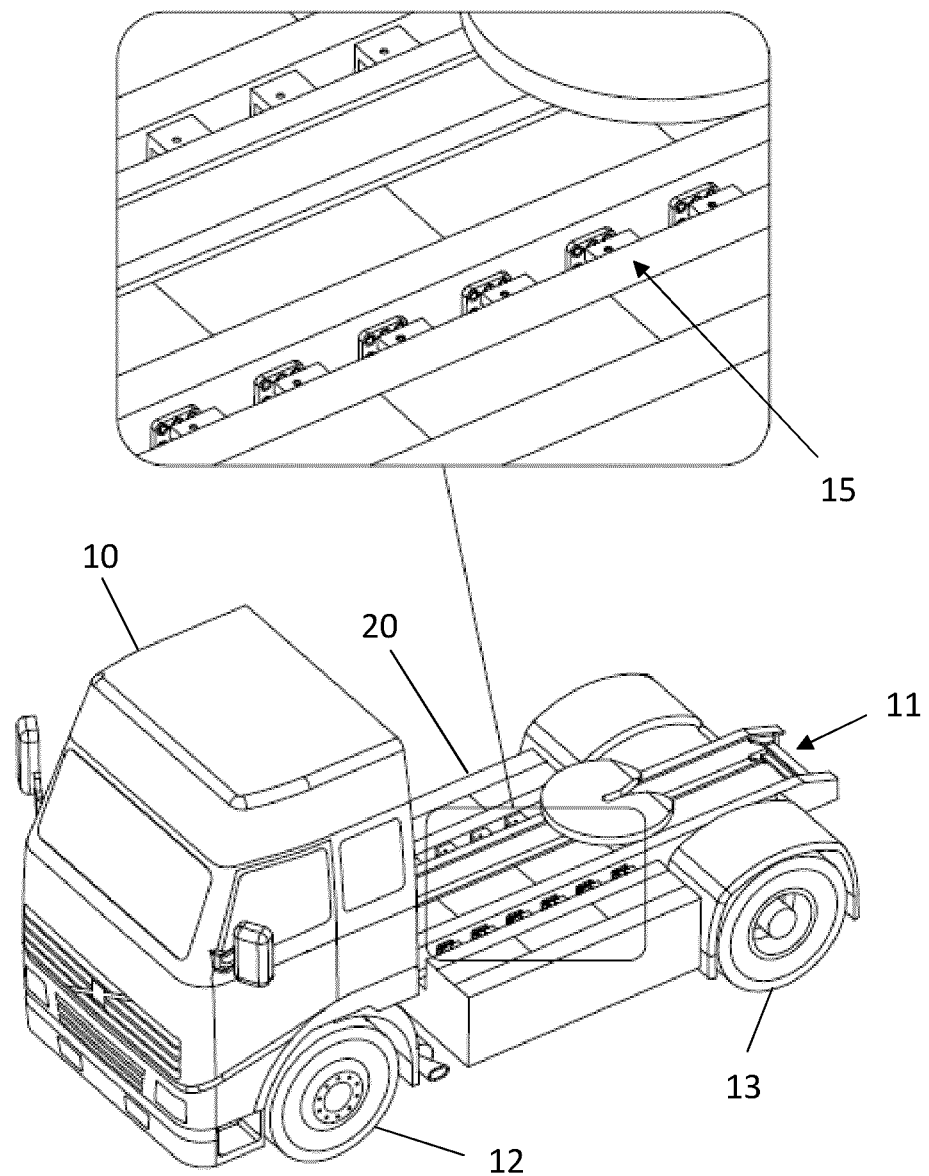
FIG. 1 is a schematic illustration of a vehicle with a mounting system.

In FIG. 1, reference numeral 10 generally shows a heavy-duty vehicle. The exemplified vehicle is shown as a truck arranged for receiving a trailer but other types of trucks, buses, working machines, and construction equipment may be applicable for the present solution. The vehicle in this case is equipped with an accessory unit 20 attached to a frame 11 of the vehicle. The accessory unit is located between the front wheels 12 and rear wheels 13 of the vehicle and mounted to the frame 11 with a mounting system 15. It should be noted that the accessory unit may be located at other locations on the vehicle different from between the front and rear wheels. The accessory unit 20 may for instance be an energy storage system (ESS) such as a battery pack but other types of accessory types may be of interest for mounting to the vehicle using the present solution.

Figure 2:
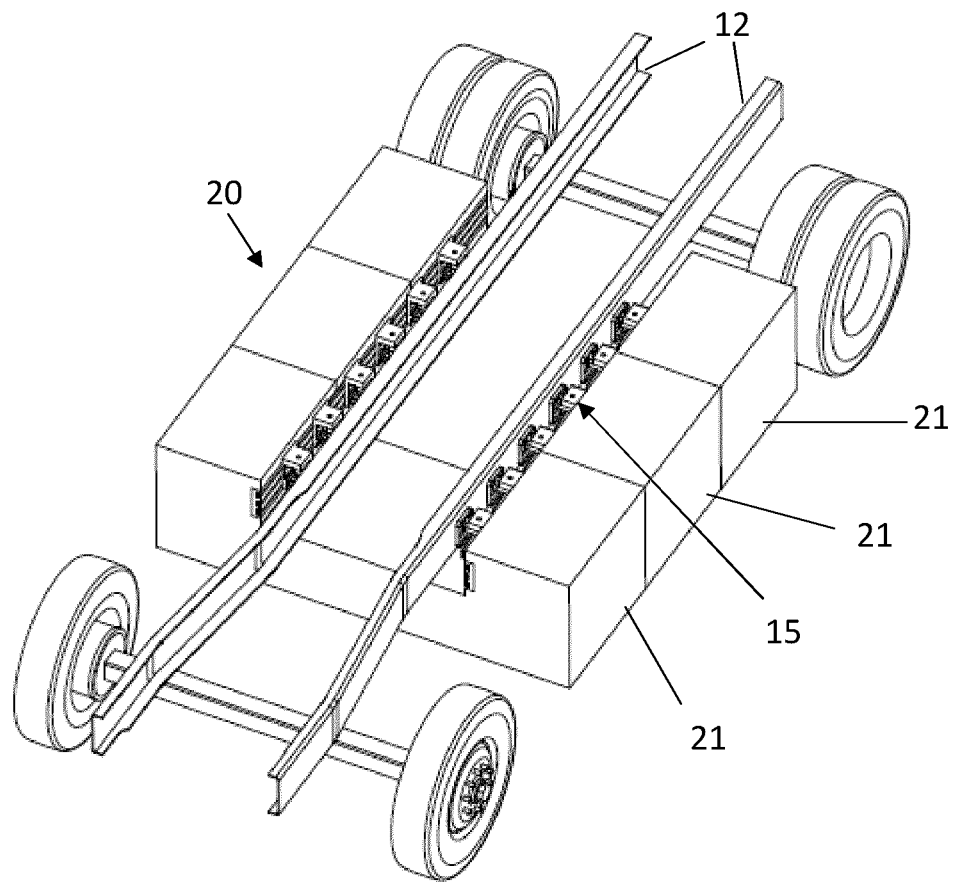
FIG. 2 is a detailed schematic of a vehicle frame with the mounting system.

FIG. 2 shows a more detailed view of the accessory unit, such as an energy storage system, mounted to the frame 11 via two side rails 12 using the mounting system 15. The side rails 12 provide a base structure for mounting equipment and accessories to be used on or with the vehicle. The accessory unit 20, e.g. the ESS, may comprise one single module or a plurality of modules 21 attached adjacent each other and together forming a continuous unit in the longitudinal direction of the vehicle.

Figure 3:
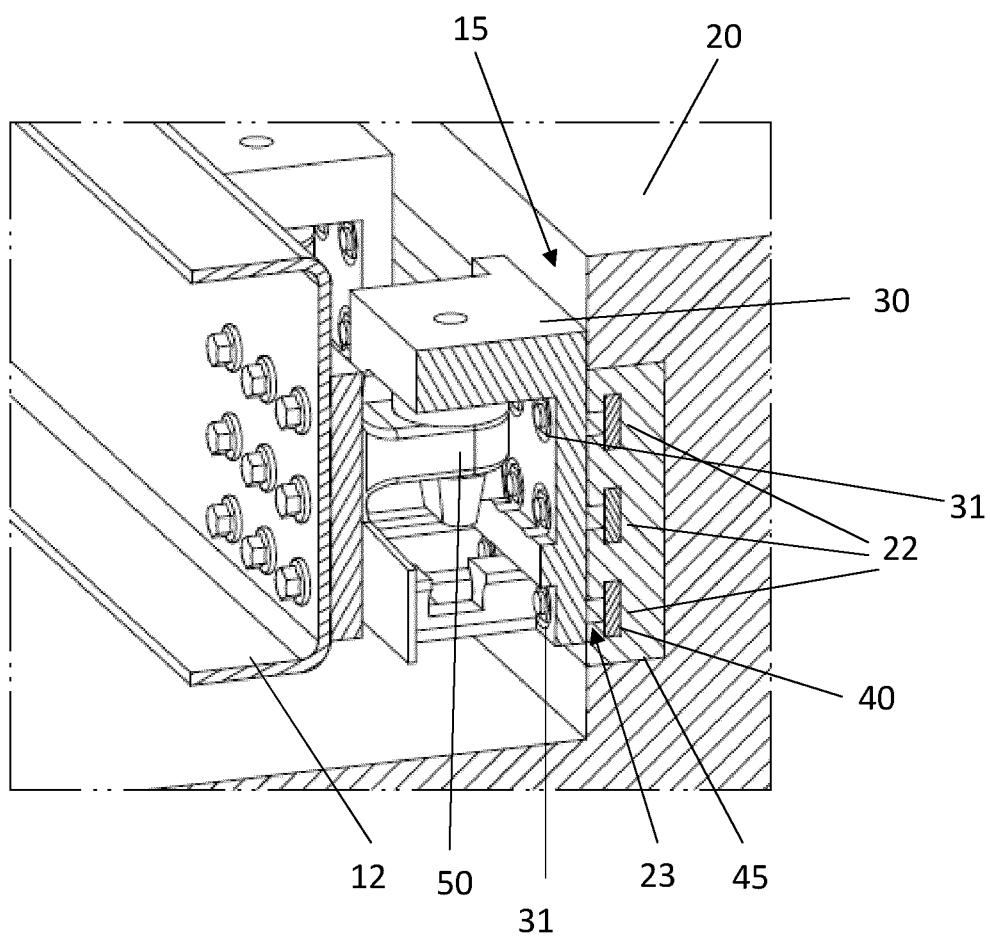
FIG. 3 is a schematic 3D view of the mounting system in detail.

In FIG. 3, a more detailed view of the mounting system 15 is shown. The mounting system 15 comprise at least one mounting bracket 30 arranged to receive a frame-mounted bushing 50 attached to the frame 11 via a side rail 12 of the frame. The side rail may comprise a plurality of openings (not shown) for receiving fastening elements, such as screws and nuts or similar, for fastening different types of equipment, for instance the frame-mounted bushing 50. The mounting bracket 30 of the accessory unit 20 is arranged to receive the bushing in such a way to restrict the movement of the accessory unit in a horizontal direction; for instance, the mounting bracket may comprise a receiving cavity (not shown) that receives a protruding element 53 of the frame-mounted bushing.

The mounting system further comprise at least one sliding element for receiving the mounting bracket and fit in the side channels providing a flexible and adjustable location of the mounting brackets relative the frame, i.e. the sliding element may slide in the side channels and be fastened at suitable locations in the side channel by flexible locking elements such as screw/nut, self-locking screws, or other similar elements. Such receiving element may for instance be one or more screw-strips 40, each screw-strip is attached to a side channel 22 that in turn is an integral part of the accessory unit or arranged in an element 45 attached to the accessory unit, for instance as an extruded metal profile, e.g. in aluminium. The side channel runs along the accessory unit at least part of the length of the accessory unit in order to provide a suitable mechanical support of the accessory unit to the vehicle. The side channel comprise a locking arrangement 23 for securing the screw-strip to the mounting bracket 30 to the accessory unit as will be discussed further below.

The accessory unit is mounted onto the frame-mounted bushing by lifting the accessory unit up and then lowering it onto the protruding element of the bushing. The mounting bracket may be arranged with a receiving element (not shown) that receives the protruding element of the frame-mounted bushing thus restricting the movement in a horizontal plane. The movement of the accessory unit may further be restricted in the vertical direction by some locking mechanism (not shown).

Figure 4:
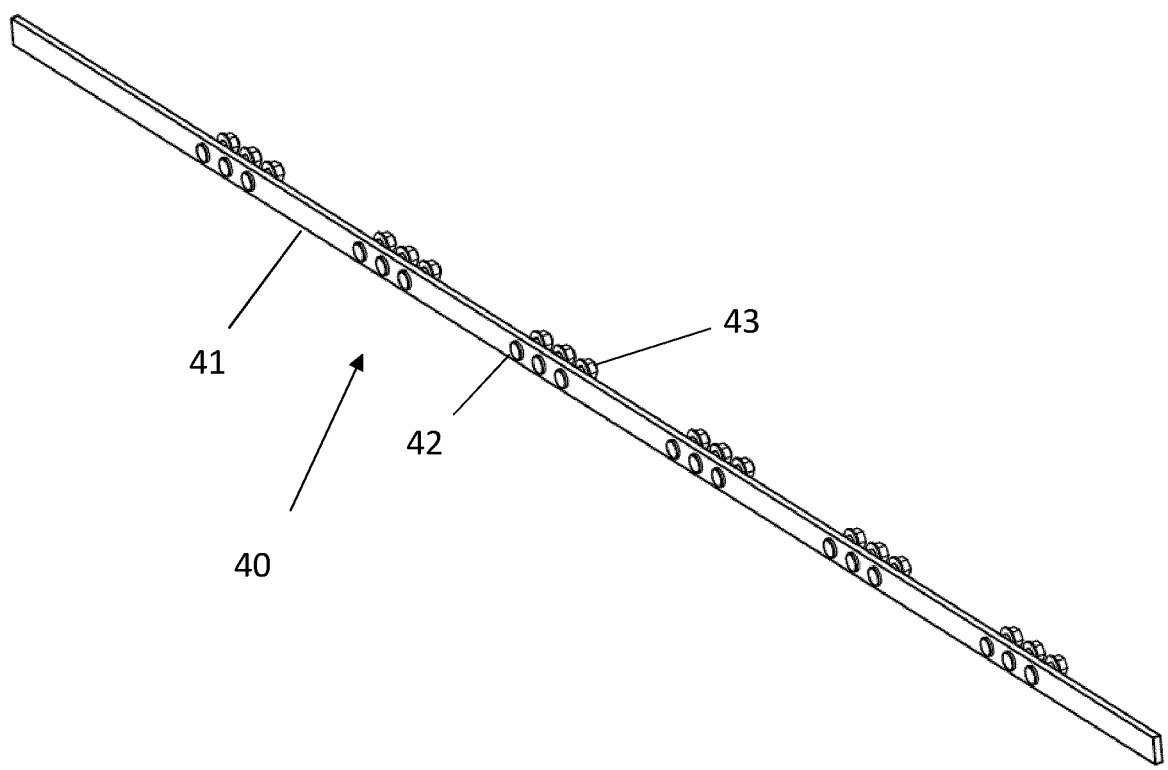
FIG. 4 is a schematic 3D view of a screw-strip.

The screw-strip comprise an elongated plate 41 with a plurality screws 42 attached to the screw-strip and each screw is arranged to receive a nut 43 as can be seen in FIG. 4. The screws are located at suitable locations or intervals on the screw-strip as matching positions of the at least one frame-mounted bracket 30 attached to the frame 11 via the side rail 12 part of the frame. The screws on the screw-strip mate with the mounting bracket 30 in openings 31 and the screws are attached to the mounting bracket by nuts 43. The screws are pressed against the side channel 22 locking arrangement 23 when the nuts are tightened and thus fixating the mounting bracket to the accessory unit via the screw-strip. The locking arrangement may for instance comprise a generally U shaped profile with inwardly protruding flanges with an opening that enable the screw to fit within, and acting as locking members for the screw-strip and the locking arrangement may be an integral part of the accessory unit or the element attached to the accessory unit. It should be noted that other fastening means then screws and nuts might be used for attaching the screw-strip to the mounting bracket.

Figure 5:
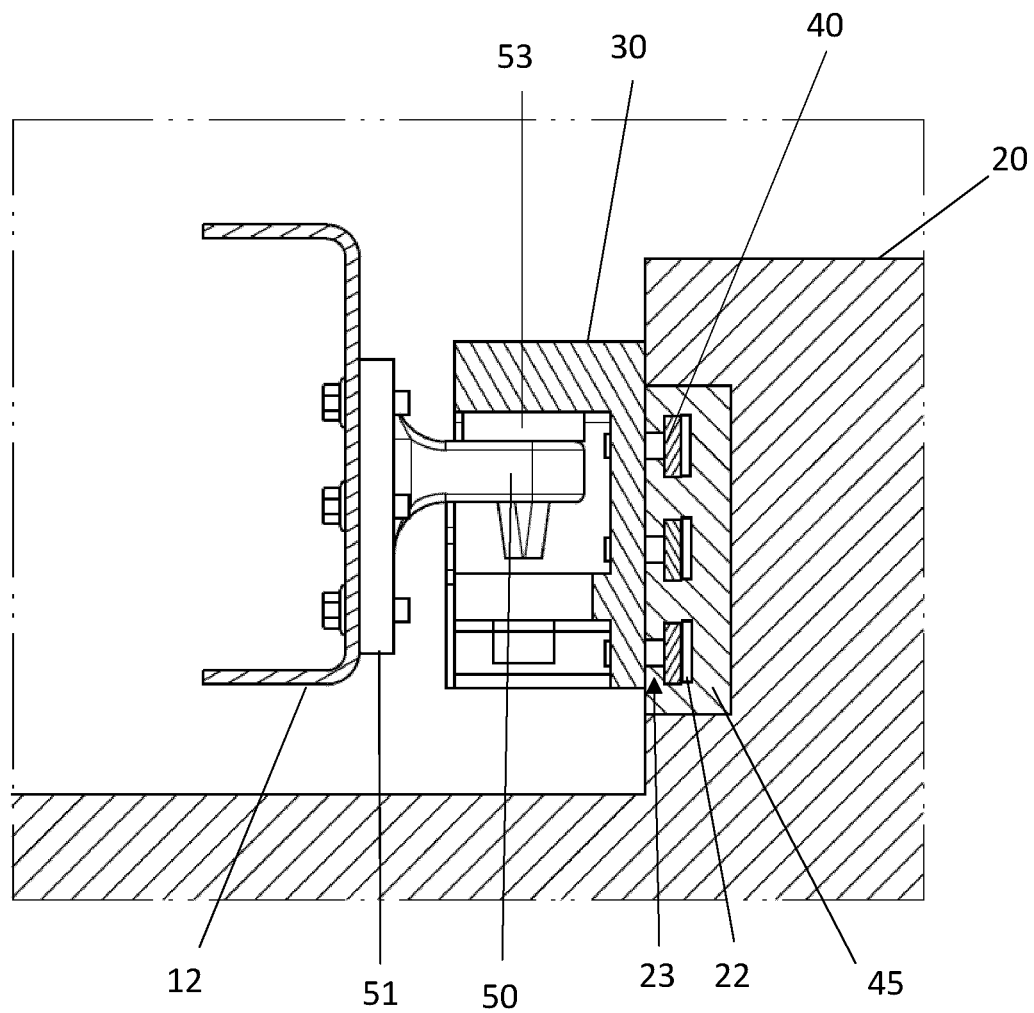
FIG. 5 is a schematic cross-sectional side view of the mounting system.

FIG. 5 shows a side cut view of the mounting system with the accessory unit 20, e.g. an energy storage system (ESS), the mounting bracket 30, and the frame-mounted bushing 50. The accessory unit 20 comprise in this case a plurality of side channels 22 located in this example a separate element 45 attached to the accessory unit. The frame-mounted bushing comprise a bracket for attachment to the side rail 12 of the frame 11 and the protruding element 53 onto which the mounting bracket rests on. In FIG. 5, the locking arrangement 23 is shown more clearly. The side channels 22 are slightly larger than the screw-strips providing an easier sliding of the screw-strips into the side channels during installation of the mounting system to the accessory unit and easier adjustments of the position of the mounting bracket relative the frame-mounted bushings.

Figure 6:
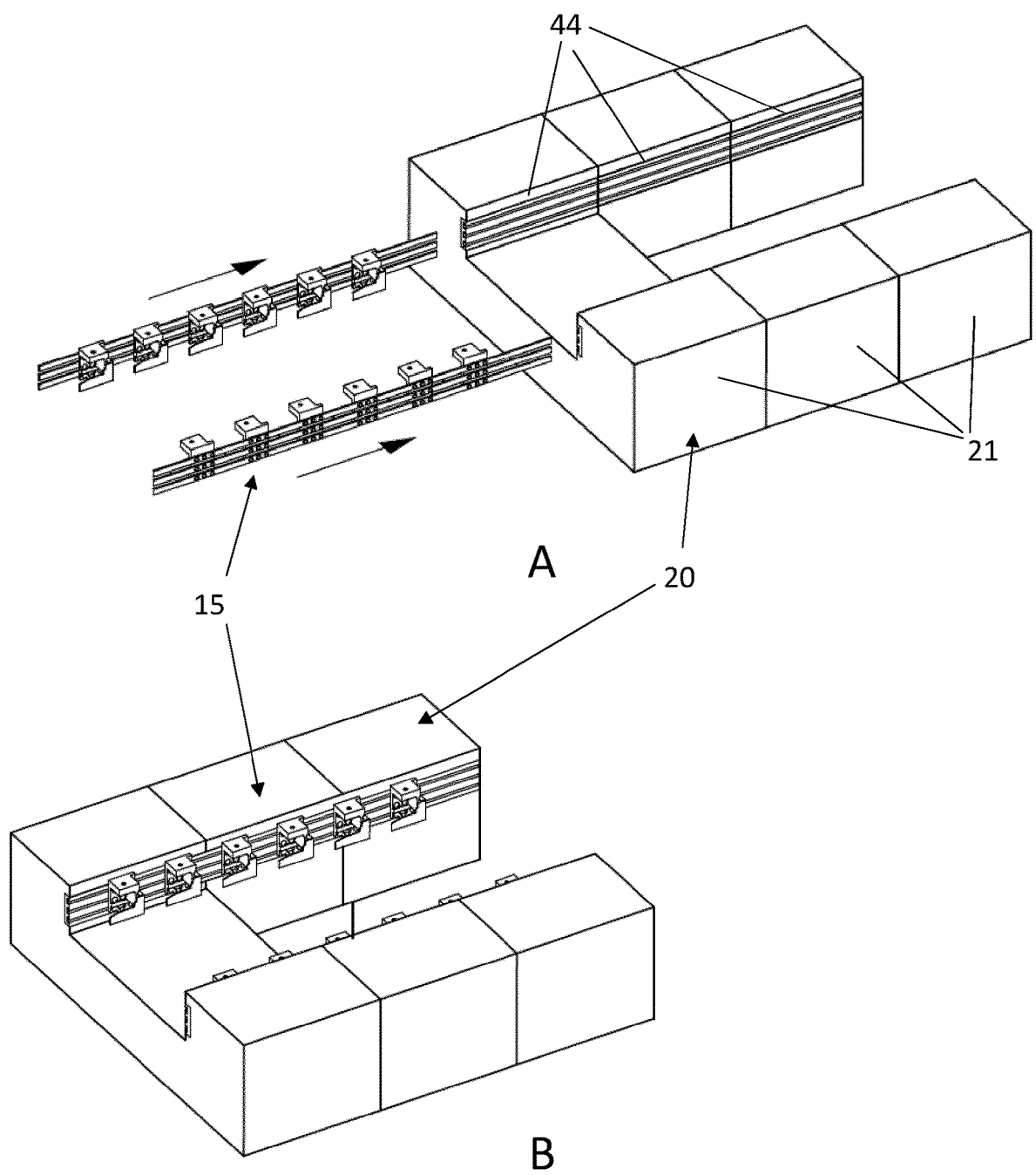
FIG. 6 is a schematic mounting procedure of the mounting system.

The accessory unit, for instance an ESS unit, may comprise several units attached to each other and together forming a continuous unit and the side channels may be provided as several units and attached or integrated in the accessory units such as forming continuous channels along the accessory units for the screw-strip to run along. This is illustrated in FIG. 6, wherein several side channels 44 are located in or in a plurality of accessory units 21. In FIG. 6A, it is also shown that the screw-strips with the mounting brackets are made to slide into the side channels into a position for mounting the accessory to the frame (FIG. 6B). Since the screw-strip(s) slides easily along the side channels these can easily be adjusted into correct positions or intervals for mounting of the accessory unit to the vehicle. In the example of FIG. 6, the accessory unit is a large and potentially heavy unit, thus two combined screw-strips/mounting brackets packages on each side of the accessory unit are used in order to provide a stable and secure mounting solution.

The side channels longitudinal direction may be in the travelling direction of the vehicle and by controlling the locking stiffness of the screw-strip in relation to the accessory unit, a controlled mechanical behaviour of the accessory unit 20 in case of rapid retardation, e.g. in case of an accident, may be provided. This may for instance be provided by controlling the torque applied on the nuts securing the screws, the number of screw/nuts used for attachment to the mounting bracket, or by providing a controlled frictional behaviour between each screw and the locking arrangement 23. Thus, if the vehicle is subjected to a rapid retardation, the accessory unit may be allowed to move relative the frame in a controlled manner and thus reducing the immediate impact on the overall structure of the vehicle.

Figure 7:
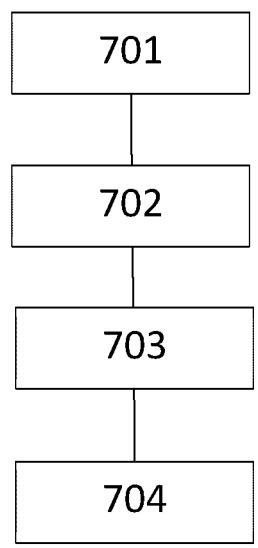
FIG. 7 is a schematic block diagram illustrating a method of mounting an accessory unit to a vehicle.

FIG. 7 shows a method of mounting the accessory unit to the vehicle. The method comprise the steps of:
701. The mounting bracket or brackets are pre-mounted on to the screw-strip(s) at the pre-defined intervals defined by matching mounting positioned of the at least one frame-mounted bushing 50 fixed on the side rail 12 mounted to the frame 11 of the vehicle. For instance, as seen in FIG. 6, three screw-strips are used for each side of the accessory unit and a plurality of mounting brackets are attached to the screw-strips.
702. When the mounting brackets are attached to the screw-strips, the combined screw-strip/mounting brackets slides into one or more side channels attached to or integrated into the accessory unit. Again referring to FIG. 6, one combined package on each side of the accessory unit slides into corresponding side channels.
703. When the screw-strip(s) is at suitable location in the side channel, the screw-strip is secured to the side channel. For instance, by fastening the nut 43 in turn pressing the screw 42 head towards the locking arrangement 23. In this way, the movement of the mounting bracket(s) and screw-strip(s) are secured and locked relative the side channels and accessory unit.
704. In a final step, the accessory unit 20 together with the mounting system is lifted so as the protruding element 53 of the mounting bracket is lifted onto the frame-mounted bushing of the vehicle and thus the mounting bracket rests on the frame-mounted bushing.

It is to be understood that the present invention is not limited to the embodiments described above and illustrated in the drawings; rather, the skilled person will recognize that many changes and modifications may be made within the scope of the appended claims.

The invention claimed is:

1. A mounting system for mounting at least one accessory unit to a vehicle frame of a vehicle, wherein the mounting system comprises:
    at least one side channel of the at least one accessory unit;
    at least one screw-strip comprising a plate with a plurality of screws fitted at pre-defined intervals defined by matching mounting positions of at least one frame-mounted bushing, wherein the at least one screw-strip is displaceably fitted in the at least one side channel; and
    at least one mounting bracket arranged to receive the plurality of screws fitted on the at least one screw-strip, the at least one mounting bracket configured to receive a nut for each screw of the plurality of screws, whereby the plurality of screws are pressed towards a locking arrangement in the at least one side channel, and wherein the at least one mounting bracket is arranged to receive the at least one frame-mounted bushing mounted to a side rail of the vehicle frame.

2. The mounting system of claim 1, wherein the at least one screw-strip provides a frictional breaking function of the mounting system when the vehicle is subjected to a rapid retardation.

3. The mounting system of claim 2, wherein the frictional breaking function is determined by the number of screws of the plurality of screws attached to the at least one screw strip.

4. The mounting system of claim 2, wherein the frictional breaking function is determined by a torque applied to each screw of the plurality of screws mounted to the at least one mounting bracket.

5. The mounting system of claim 1, wherein the at least one side channel comprises at least two side channels, and the at least one screw-strip comprises at least two screw-strips.

6. The mounting system of claim 1, wherein the at least one side channel comprises a plurality of sections attached longitudinally to each other and together forming a continuous length along the at least one accessory unit.

7. The mounting system of claim 1, wherein the at least one side channel is provided as an integral part of the at least one accessory unit or attached to a side of the at least one accessory unit.

8. The mounting system of claim 1, wherein each side channel of the at least one side channel comprises a generally U-shaped profile with inwardly protruding flanges acting as locking members for the at least one screw-strip.

9. The mounting system of claim 1, wherein the at least one side channel is formed in an extruded metal profile.

10. The mounting system of claim 9, wherein the extruded metal profile is an aluminium profile.

11. The mounting system of claim 1, wherein the at least one accessory unit is an energy storage system.

12. The mounting system of claim 1, further comprising a bushing arranged to be mounted on a side rail of the vehicle, and wherein the bushing comprises a protruding element arranged to receive the at least one mounting bracket.

13. A vehicle comprising the mounting system of claim 1.

14. A method of mounting an accessory unit to a vehicle, the method comprising the steps of:
- pre-mounting at least one mounting bracket on at least one screw-strip comprising a plurality of screws fitted at pre-defined intervals defined by matching mounting positions of at least one frame-mounted bushing fixed on a side rail mounted to a frame of the vehicle;
- sliding each screw-strip of the at least one screw-strip into corresponding side channels attached to the accessory unit;
- securing the at least one screw-strip to the corresponding side channel, thereby fixing the at least one screw-strip relative to the side channel; and
- lifting the accessory unit into a position where the at least one mounting bracket rests on the at least one frame-mounted bushing.

\* \* \* \* \*